(12) United States Patent
Larson et al.

(10) Patent No.: US 8,513,839 B1
(45) Date of Patent: *Aug. 20, 2013

(54) FAN WITH DAMPER

(76) Inventors: John L Larson, Rockford, MI (US);
Steven J Larson, Jenison, MI (US)

(*) Notice: Subject to any disclaimer, the term of this patent is extended or adjusted under 35 U.S.C. 154(b) by 242 days.

This patent is subject to a terminal disclaimer.

(21) Appl. No.: 12/885,686

(22) Filed: Sep. 20, 2010

Related U.S. Application Data (63) Continuation-in-part of application No. 12/435,459, filed on May 5, 2009, now Pat. No. 7,800,262.

(51) Int. Cl.
*H02K 9/00* (2006.01)
*H02K 41/02* (2006.01)
*F04B 35/04* (2006.01)
*H02K 9/06* (2006.01)

(52) U.S. Cl.
CPC ....................... *H02K 9/06* (2013.01)
USPC .......... 310/58; 310/12.14; 310/191; 415/119; 417/423.7

(58) Field of Classification Search
CPC ...................................................... H02K 9/06
USPC ................. 310/12.14, 58, 191; 417/423.7; 415/119
IPC .................................. H02K 41/02; F04B 35/04
See application file for complete search history.

(56) References Cited

U.S. PATENT DOCUMENTS

| | | | |
|---|---|---|---|
| 2,760,092 A * | 8/1956 | Galinski | 310/83 |
| 2,869,008 A * | 1/1959 | Carlsen | 310/209 |
| 3,233,135 A * | 2/1966 | Holzer et al. | 310/209 |
| 3,567,980 A * | 3/1971 | Kreuter | 310/209 |
| 4,152,094 A * | 5/1979 | Honda et al. | 415/119 |
| 4,885,489 A * | 12/1989 | Stuhr | 310/78 |
| 5,045,741 A * | 9/1991 | Dvorsky | 310/209 |
| 5,117,143 A * | 5/1992 | Iddings | 310/191 |
| 5,176,509 A * | 1/1993 | Schmider et al. | 417/423.7 |
| 5,716,200 A * | 2/1998 | Mirumachi et al. | 417/360 |
| 6,394,768 B1 * | 5/2002 | Fukuda et al. | 417/423.15 |
| 6,591,612 B2 * | 7/2003 | Bolz et al. | 60/608 |
| 7,425,119 B2 * | 9/2008 | Bolz | 417/366 |
| 7,800,262 B1 * | 9/2010 | Larson | 310/58 |
| 2002/0134082 A1 * | 9/2002 | Bolz et al. | 60/608 |
| 2003/0184177 A1 * | 10/2003 | Enzinna | 310/93 |
| 2004/0253127 A1 * | 12/2004 | Nakano et al. | 417/423.7 |

* cited by examiner

*Primary Examiner* — John K Kim (57) ABSTRACT

A fan with damper includes a motor and a fan located in a duct ventilation passage. The motor is connected with the fan to drive the fan and move air or other gases through the duct. The motor has a drive shaft that slides along its length between on and off positions. A damper is also located in the passage, is operatively connected with the drive shaft such that the damper moves to an open position when the drive shaft slides to its on position and the damper moves to a closed position when the drive shaft slides to its off position.

10 Claims, 8 Drawing Sheets

FAN WITH DAMPER

CROSS-REFERENCE TO RELATED APPLICATIONS

This is a continuing non-provisional utility patent application of U.S. Non-provisional patent application Ser. No. 12/435,459, entitled Centrifugal Drop Fan and Valve with Sliding Motor and filed on 5 May 2009 by John Leo Larson, now U.S. Pat. No. 7,800,262, issued 21 Sep. 2010, the disclosure of which is incorporated here by reference.

BACKGROUND OF THE INVENTION

The invention relates to ventilation and more specifically to space ventilation and affirmative control of consequential drafts through ventilation ducting.

Situations of using a fan to conduct air or other gases from or into a space are frequent and commonly known. In residential buildings, one may find a bathroom exhaust fan, a kitchen ventilation hood and the like, a water heater exhaust fan, and a furnace exhaust fan, for example. Commercial applications include at least the same situations. In some of these fan and ducting installations, a flap damper may be included to limit back drafting as one having ordinary skill in the art knows. The flap damper is typically minimally effective, however, as is also well known. Further, the flap damper is not designed in consideration of blocking a known chimney effect by which conditioned air may bleed outside a space. Each of these shortcomings of known applications of a fan with ducting are expensive and environmentally hostile as is known to one having ordinary skill in the art.

Thus, a need for a fan with damper that affirmatively controls duct ventilation flow is readily understood.

BRIEF SUMMARY OF THE INVENTION

Accordingly, a fan with damper of the invention includes a motor and a fan located in a duct ventilation passage. The motor is connected with the fan to drive the fan and move air or other gases through the duct. The motor has a drive shaft that slides along its length between on and off positions. A damper is also located in the passage, is operatively connected with the drive shaft such that the damper moves to an open position when the drive shaft slides to its on position and the damper moves to a closed position when the drive shaft slides to its off position.

In another aspect of the invention, the fan may have a base plate that is near a duct wall such that a low pressure area is induced between the fan and the wall whereby the fan is drawn toward the wall when the fan is actuated.

These and other features, objects, and benefits of the invention will be recognized by one having ordinary skill in the art and by those who practice the invention, from this disclosure, including the specification, the claims, and the drawing figures.

DETAILED DESCRIPTION OF THE INVENTION

Preferred embodiments of a fan with damper according to the invention are generally shown in the drawing figures and discussed herein. The concept of the invention transcends various specific implementations or configurations of the invention such that principle elements may be identified with common reference numbers across the various embodiments discussed. The principle elements may include a fan 20, a motor 30 including a drive shaft 40 that slides along its length between an on position and an off position, a damper 50 and a cooperating damper seat 60.

A first embodiment 100 of a fan with damper according to the invention is shown in drawing FIGS. 1-4. A housing 110 defining a passage 112 through the housing and having an inlet 114, and an outlet 116 is provided. The fan 20 is located in the passage. The motor 30 is connected with the housing and with the fan such that the motor actuates the fan, inducing a flow of air through the passage as one having ordinary skill in the art understands. While the discussion of the invention may generally refer to air, one having ordinary skill in the art also understands that the invention may be applied to various gases, including air and noxious gases.

Figure 1:
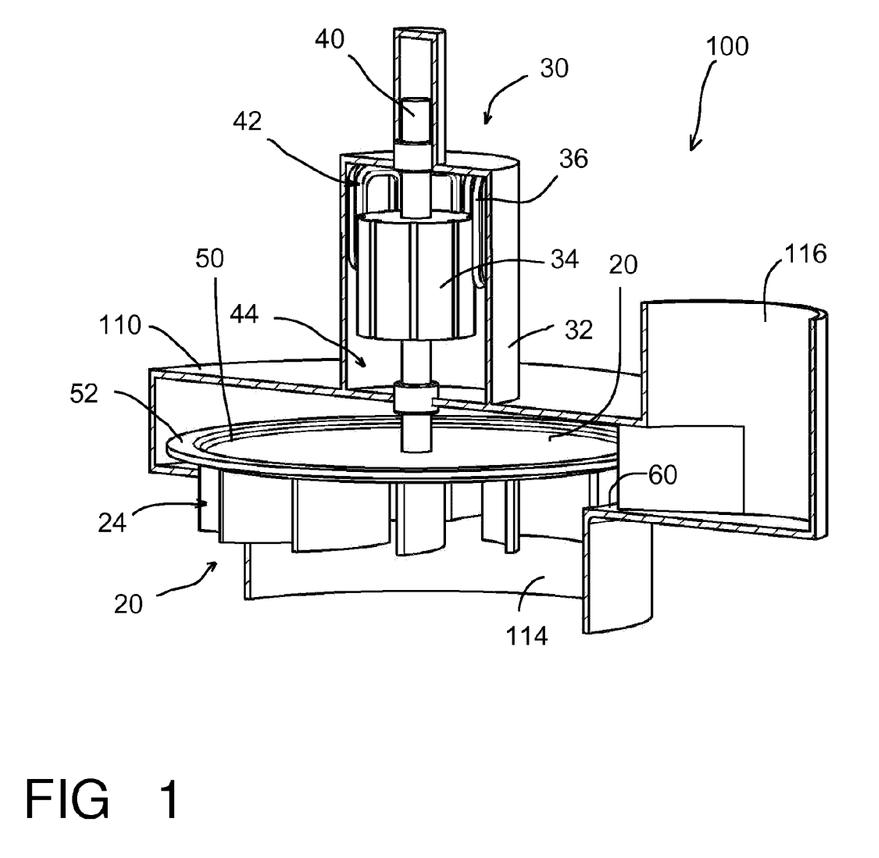
FIG. 1 is a fragmentary perspective view of a segment of ventilation duct into which a fan with damper is installed according to a first embodiment of the invention, showing the damper between open and closed positions.
Figure 2:
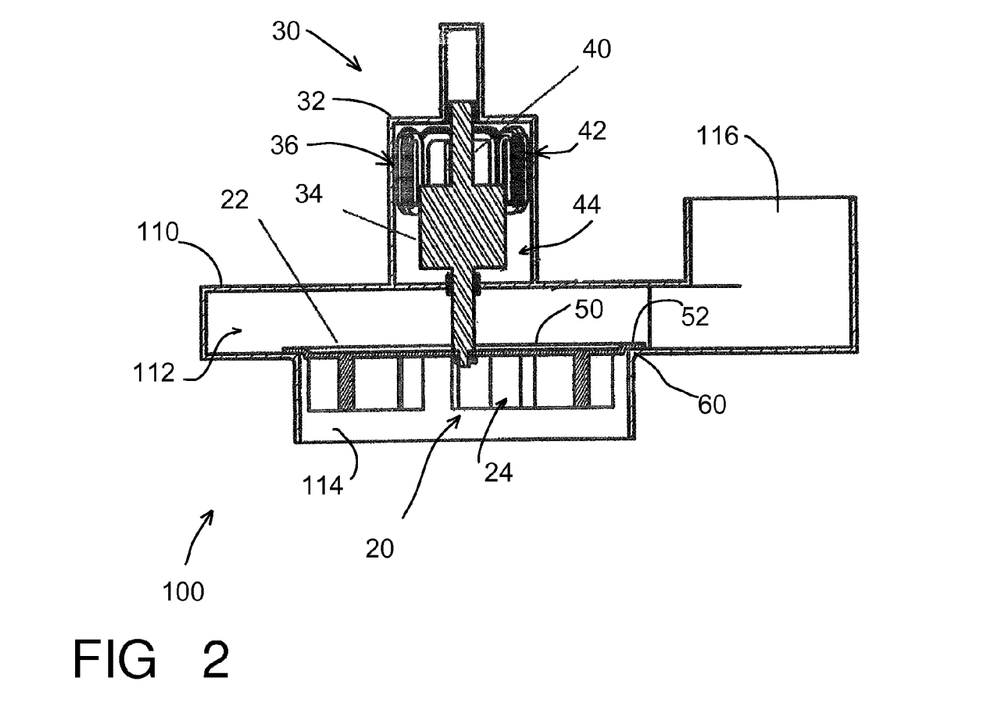
FIG. 2 is a fragmentary cross section view thereof, showing the damper in the closed position.
Figure 3:
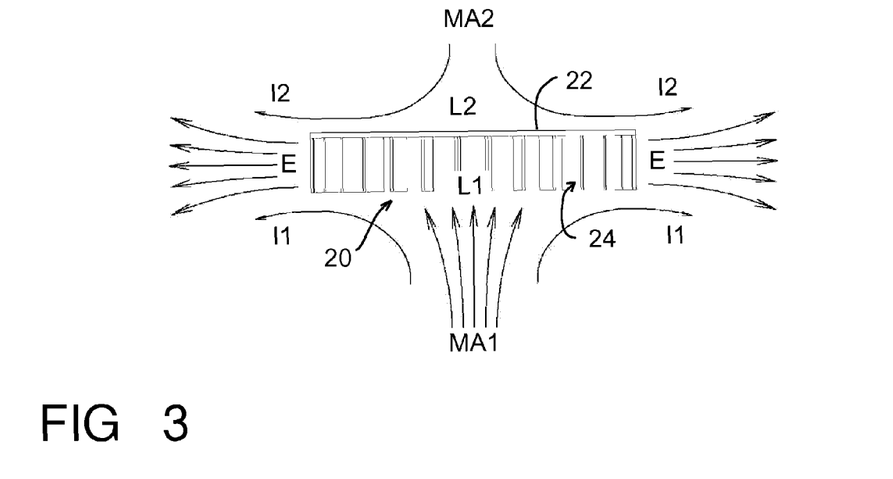
FIG. 3 is a schematic representation of air circulation about a centrifugal fan thereof.

As described in the parent patent, U.S. Pat. No. 7,800,262, the motor 30 is provided with a drive shaft 40 that slides along its length between an on position and an off position 44 (FIG. 2). A part of the motor's frame 32 is extended to allow the motor's drive shaft and its armature 34 to slide to a bottom or an end of the motor frame to the off position 44, when the motor is in an off condition (FIG. 2). The drive shaft may be biased toward this off position at the bottom of the motor frame by mounting the motor with the drive shaft oriented generally vertically such that gravity may bias the drive shaft to the off position as is generally shown in the drawing figures. Alternatively, a spring or other bias device (not shown) may be employed, although this may be unnecessarily complicated and lend to unreliability as is understood by one having ordinary skill in the art. When electricity is applied to the motor 30 in an on condition, the motor's drive shaft 40 is pulled into an operational or on position 42 by solenoid-like magnetic effect between the motor's armature 34 and the motor's windings 36 (FIG. 1) as is understood by one having ordinary skill in the art.

The fan 20 may be provided with a base plate 22 with an array of blades 24 extending there from. With attention to drawing FIG. 3, one may see a circulation of air about the fan 20 when actuated in open air. Air is expelled from the fan at relatively high velocity and pressure as noted at E. This develops a low pressure area L1 toward the center of the fan on a front side of the fan and the base plate. This low pressure draws makeup air MA1 into the fan on the front side of the fan and the base plate as shown. A secondary circulation of air I1 is induced by the flow of air from MA1 to E. Another secondary circulation of air I2 is also induced by flow of makeup air MA2 to E on a back side of the fan and the base plate, that is opposite the fan relative to MA1. The circulation I2 is also responsive to a low pressure area L2 developed toward the center of the fan, on a back side of the fan.

Figure 4:
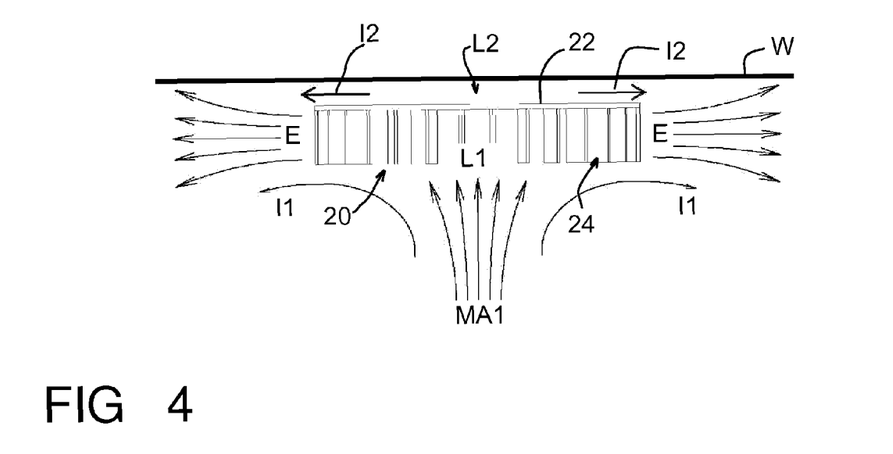
FIG. 4 is the view of FIG. 3 showing an adjacent wall influencing the air circulation such that a low pressure area develops between the wall and the fan.

Turning to drawing FIG. 4, the open air circulations about the fan 20 are seen to be modified with the introduction of a wall W, which may represent a wall of a ventilation duct or a housing, including housing 110. One having ordinary skill in the art understands the common and ordinary meaning of the term "wall" as used here, namely, a material layer enclosing space. With wall W in play, as it were, makeup air M2 is limited by the wall W such that the low pressure area L2 may be said to develop as a static low pressure area. With the presence of wall W, the low pressure area L2 tends to "lift" the fan base plate 22, and so the fan 20, toward the wall, which enhances or supplements the solenoid-like lift effect between the motor's armature 34 and the motor's windings 36, discussed above.

One may see from the drawing figures (FIGS. 1 & 2) that the fan 20 and the inlet 114 are cooperatingly configured such that the fan may slide into and out of the inlet. One may further see that the fan may be mounted to the drive shaft 40 and that the drive shaft positioned such that the fan slides into the inlet to an off position with the drive shaft when the motor 30 is in its off condition (FIG. 2). Conversely, the fan may slide out of the inlet to an on position with the drive shaft when the motor is in its on condition (FIG. 1).

The fan 20 and more specifically the fan base plate 22, is most preferably provided with a perimeter lip 52 that extends the base plate generally radially outward and defines a damper 50 that comprises the base plate and the lip. The inlet 114 is configured with a mating surface that corresponds to the damper perimeter lip 52 and that defines a cooperating annular damper seat 60 on a downstream side of the inlet as shown. Thus, in operation, the fan may nest into the inlet when the motor 30 is in its off condition and the drive shaft moves to its off position 44, such that the damper engages the damper seat (FIG. 2). With the damper and the corresponding damper seat engaged, flow through the passage 112 is affirmatively restricted.

Conversely, the fan 20 may slide out of the inlet 114 (FIG. 1) to an on position with the drive shaft when the motor 30 is in its on condition and the drive shaft moves to its on position 42, such that the damper 50 disengages the damper seat 60. With the damper and the corresponding damper seat disengaged, flow through the passage 112 is provided and induced with the fan being actuated by the motor. Further, proximity of the fan base plate 22 with the wall W tends to "lift" the fan, enhancing the solenoid-like lift effect between the motor's armature 34 and the motor's windings 36, discussed above.

Figure 5:
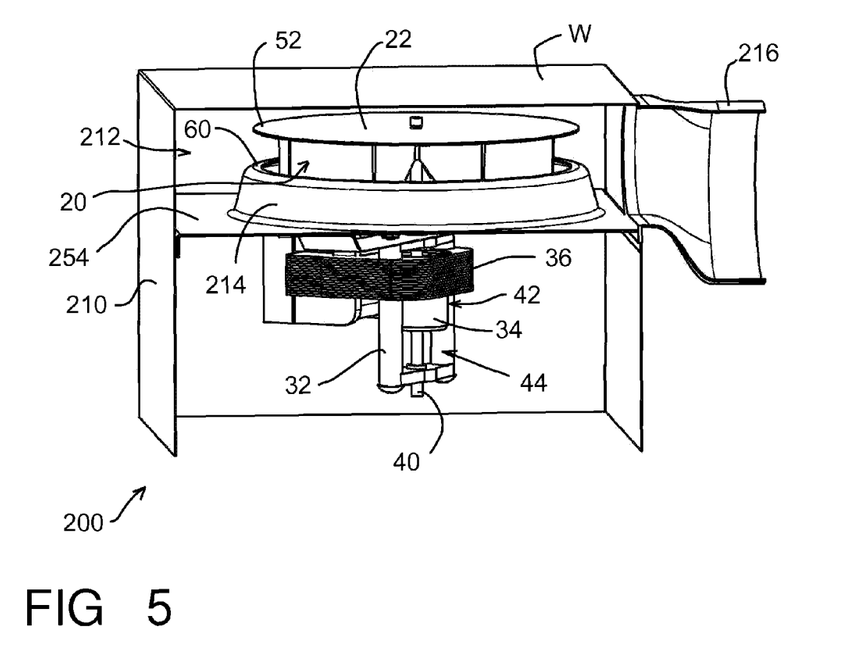
FIG. 5 is a fragmentary perspective view of a box-shaped segment of ventilation duct into which a fan with damper is installed according to a second embodiment of the invention.
Figure 6:
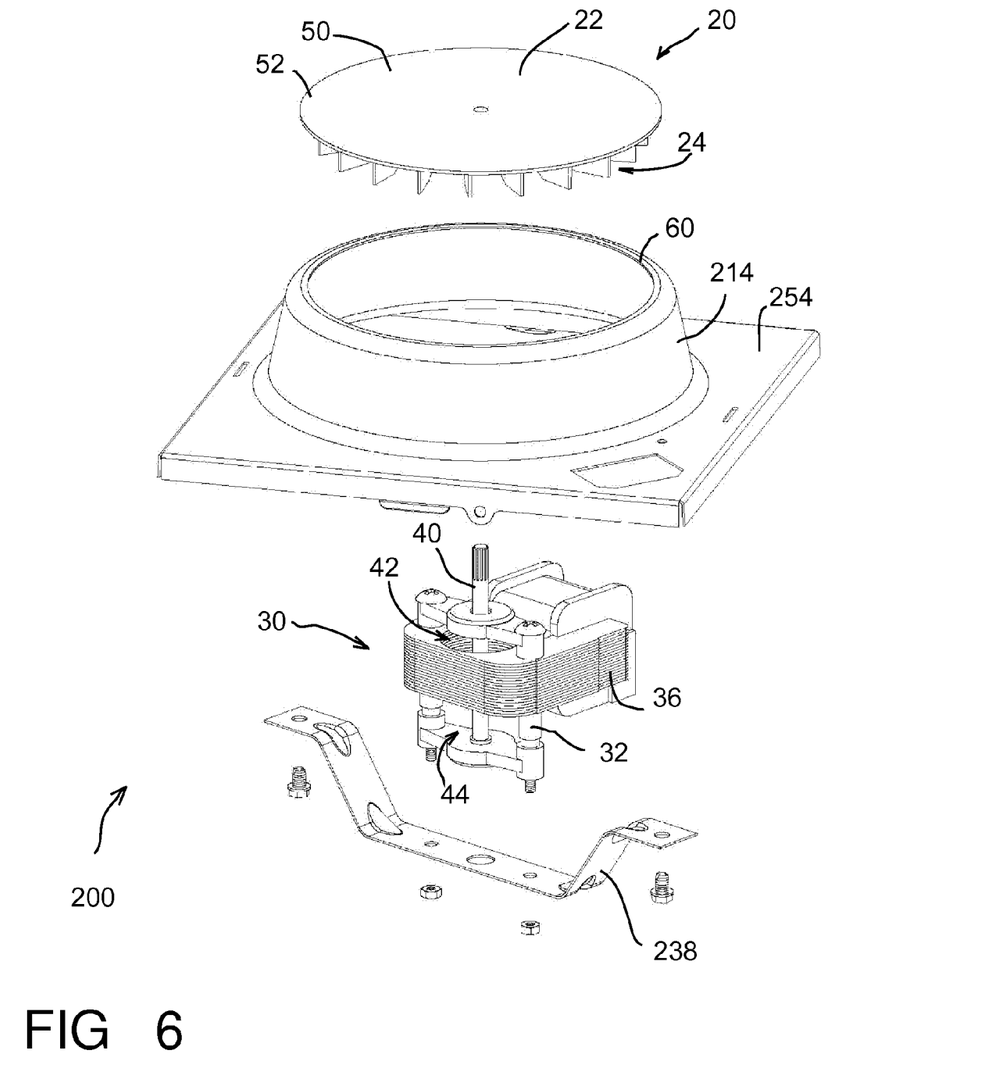
FIG. 6 is an exploded perspective view of a product model thereof.

A second embodiment 200 of a fan with damper according to the invention is shown in drawing FIGS. 5 and 6. As with the prior embodiment, this embodiment includes a fan 20 with a base plate 22 and an array of fan blades 24; a motor 30 with an extended frame 32, an armature 34, and windings 36; a damper 50; and a damper seat 60. The fan base plate 22, is again most preferably provided with a perimeter lip 52 that extends the base plate generally radially outward and defines a damper 50 that comprises the base plate and the lip.

The embodiment 200 is provided with a housing 210 defining a passage 212, an inlet 214, and an outlet 216 is provided. The fan 20 is again located in the passage. The second embodiment may be distinguished from the prior embodiment at least insofar as the motor is translated downward without inversion and mounted below the fan. The fan may be connected with an opposing end of the drive shaft 40.

The duct segment or housing 210 may also have a generally box-like configuration. A damper plate 254 may be provided between the inlet 214 and the housing. The damper plate is preferably configured to cooperate with the housing and to nest in the housing such that flow of air along the passage 212 is directed through the inlet and may not deflect around the damper plate or otherwise avoid the inlet en route through the passage 212 and the outlet 216. The damper plate may be mounted in the duct 210 by conventional and unconventional means as one having ordinary skill in the art understands.

Similar to the embodiment 100, but relative to the damper plate 254, rather than the housing 110, the inlet 214 is configured with a mating surface that corresponds to the damper perimeter lip 52 and defines a cooperating annular damper seat 60 on a downstream side of the inlet as shown. Thus, in operation, as with the prior embodiment, the fan 20 may nest into the inlet 214 when the motor 30 is in its off condition and the drive shaft 40 moves to its off position 44, such that the damper 50 engages the damper seat 60. With the damper and the corresponding damper seat engaged, flow through the passage 212 is affirmatively restricted. Conversely, the fan 20 may slide out of the inlet 214 to an on position with the drive shaft when the motor 30 is in its on condition and the drive shaft moves to its on position 42, such that the damper disengages the damper seat. With the damper and the corresponding damper seat disengaged, flow through the passage 212 is provided and induced with the fan being actuated by the motor. Further, proximity of the fan base plate 22 with the wall W tends to "lift" the fan, enhancing the solenoid-like lift effect between the motor's armature 34 and the motor's windings 36, discussed above.

Figure 7:
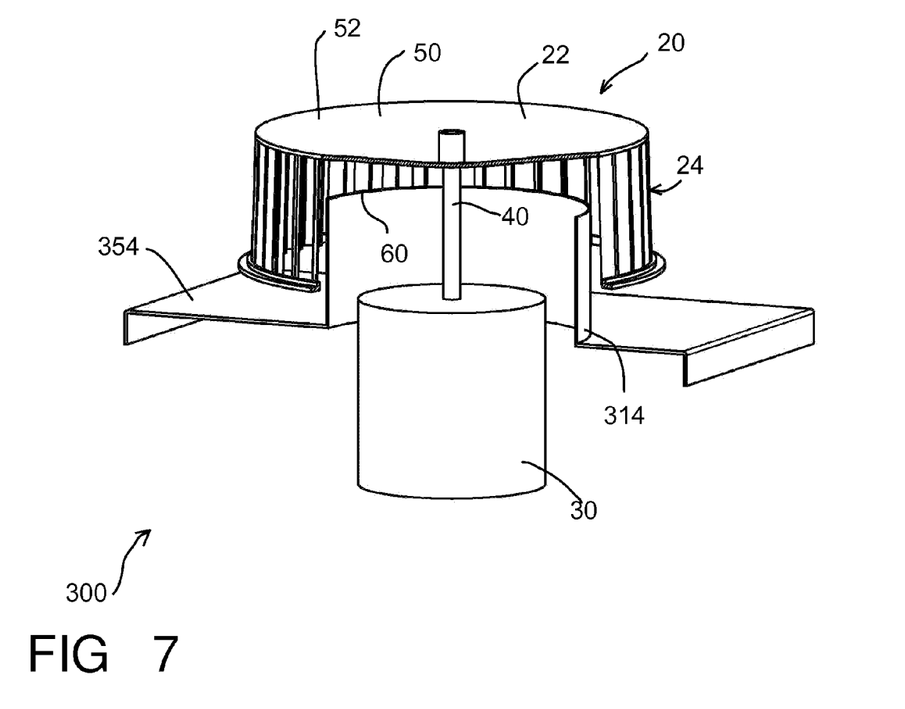
FIG. 7 is a fragmentary perspective view of a schematic representation of a third embodiment of the invention.
Figure 8:
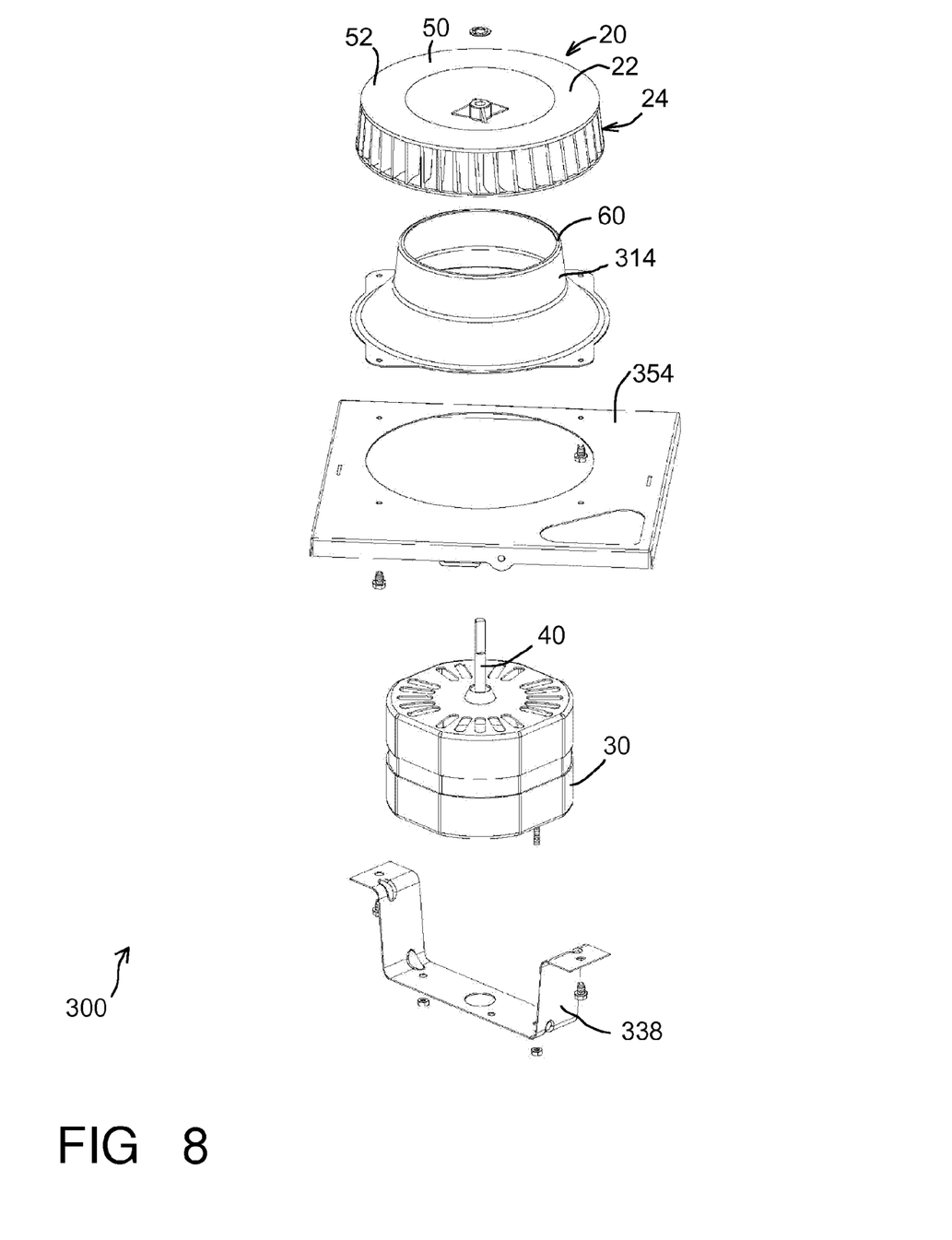
FIG. 8 is an exploded perspective view of a product model thereof.

A third embodiment 300 of a fan with damper according to the invention is shown in drawing FIGS. 7 and 8. As with the prior embodiments, this embodiment includes a fan 20 with a base plate 22 and an array of fan blades 24; a motor 30 with an extended frame, an armature, and windings as discussed and shown above; a damper 50; and a damper seat 60. A damper plate 354 may be provided, similar to damper plate 254. The motor may be connected with the damper plate by way of a bracket 338 as is understood by one having ordinary skill in the art. The third embodiment may be distinguished from the prior embodiments at least insofar as the nesting of the inlet and fan involve a reversal of parts. That is to say that the inlet 314 nests in the fan, rather than the fan nesting in the inlet. As such, then, the perimeter lip that extends the prior base plates generally radially outward is omitted. Further, the damper seat simply mates with a surface of the fan base plate 22 that is interior to the array of fan blades 24. Otherwise, the embodiment is used substantially as discussed above, regarding the prior embodiments.

As the third embodiment 300 (FIGS. 7 & 8) may be said to be similar to the second embodiment 200 (FIGS. 5 & 6) with slight modification, a fourth embodiment 400 (FIG. 9) may be said to be similar to the third embodiment with slight modification. The fourth embodiment may be positioned in a housing 410, comprising a length of duct or conduit. A damper plate 454 may be provided, again similar to damper plate 254 and to damper plate 354. The motor may be connected with the damper plate by way of a bracket 438 such that the drive shaft 40 is preferably generally parallel with a length of the duct 410. It is noted that the duct which is defining the housing is shown with a rectangular or square cross section. This detail is not material to the invention. The housing cross section may have any shape, including the common circle. The only limitation regarding the duct or housing configuration if any, may be with regard to size and insofar as the duct is preferably at least large enough for placement and operation of the fan as one having ordinary skill in the art understands.

Figure 9:
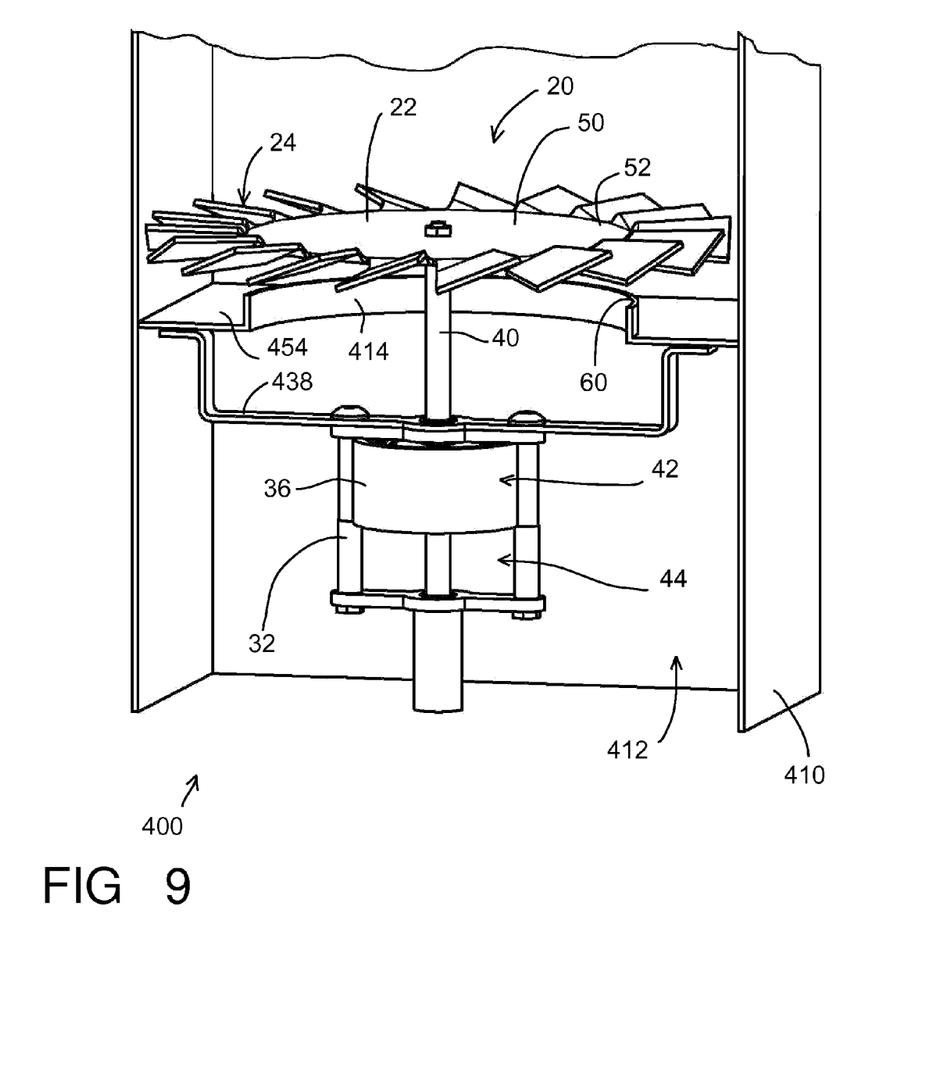
FIG. 9 is a fragmentary perspective view of a segment of ventilation duct into which a fan with damper is installed according to a fourth embodiment of the invention.

The damper plate 454 may be mounted in the duct 410 by conventional and unconventional means as one having ordinary skill in the art understands. Similar to the second 200 and the third 300 embodiments, an inlet 414 is generally defined by a ring that extends generally parallel with the length of the duct, the damper seat 60 is again provided at an end of the ring, spaced down stream from the damper plate. The fourth embodiment may be distinguished from the prior embodiments at least insofar as the fan may be considered to be of an axial configuration, rather than radial as one having ordinary skill in the art understands. As above, the inlet extends downstream from the damper plate an appropriate distance to mate with the damper plate in sealing engagement when the motor is in an off condition. Further, in this embodiment, the inlet also spaces the seat 60 from the plate 454 such that the damper plate is clear of rotation of the array of blades 424.

One having ordinary skill in the art and those who practice the invention will understand from this disclosure that various modifications and improvements may be made without departing from the spirit of the disclosed inventive concept. One will also understand that various relational terms, including left, right, front, back, top, and bottom, for example, may be used in this detailed description of the invention and in the claims only to convey relative positioning of various elements of the claimed invention without limitation to the invention.

What is claimed is:

1. A ventilation fan with a housing, the housing having inlet and outlet openings and defining a passage extending there through, with a fan located in the housing, and with a motor operatively connected with the fan, the motor having a drive shaft that slides along its length between on and off positions, and comprising a damper, comprising a damper located in the passage, the damper being moveable between a closed position in which the passage is blocked and an open position in which the passage is not blocked, the damper further being operatively connected with the drive shaft such that the damper moves between its open and closed positions in correlation to the drive shaft being in its on and off positions, respectively, wherein a cooperating damper seat is provided in the housing and wherein the damper abuts the damper seat when the damper is in its closed position and the damper is spaced from the damper seat when the damper is in its open position.

2. The combination of a fan and damper defined in claim 1 wherein the housing is provided with a wall, wherein the fan has a base plate that is spaced from the wall when the drive shaft is in its off position, and wherein the fan base plate is adjacent the wall when the drive shaft is in its on position such that operation of the fan develops a low pressure area between the fan and the wall and biases the fan toward the wall.

3. The combination of a fan and damper defined in claim 2 wherein the fan base plate defines the damper.

4. The combination of a fan and damper defined in claim 1 wherein the fan base plate defines the damper.

5. A ventilation fan with a housing, the housing having inlet and outlet openings and defining a passage extending there through, with a fan located in the housing, and with a motor operatively connected with the fan, the motor having a drive shaft that slides along its length between on and off positions, and comprising a damper, comprising a damper located in the passage, the damper being moveable between a closed position in which the passage is blocked and an open position in which the passage is not blocked, the damper further being operatively connected with the drive shaft such that the damper moves between its open and closed positions in correlation to the drive shaft being in its on and off positions, respectively., wherein the housing is provided with a wall, wherein the fan has a base plate that is spaced from the wall when the drive shaft is in its off position, and wherein the fan base plate is adjacent the wall when the drive shaft is in its on position such that operation of the fan develops a low pressure area between the fan and the wall and biases the fan toward the wall.

6. A fan with damper, comprising:
   a housing with inlet and outlet openings and defining a passage extending there through;
   a fan operatively located in the passage;
   a motor operatively connected with the fan, the motor including a drive shaft that slides along its length between an on position and an off position;
   a damper located in the passage, the damper being moveable between a closed position in which the passage is blocked and an open position in which the passage is not blocked, the damper being operatively connected with the drive shaft such that the damper moves to the open position when the drive shaft slides to the on position and the damper moves to the closed position when the drive shaft slides to the off position; and
   a cooperating damper seat provided in the housing such that the damper abuts the damper seat in sealing engagement when the damper is in its closed position and the damper is spaced from the damper seat when the damper is in its open position.

7. The fan with damper defined in claim 6 wherein the housing further defines a wall, wherein the fan has a base plate that is spaced from the wall when the drive shaft is in its off position, and wherein the fan base plate is adjacent the wall when the drive shaft is in its on position such that operation of the fan develops a low pressure area between the fan and the wall and biases the fan toward the wall.

8. The fan with damper defined in claim 7 wherein the fan base plate defines the damper.

9. The fan with damper defined in claim 6 wherein the fan base plate defines the damper.

10. A fan with damper, comprising:
    a housing with inlet and outlet openings and defining a passage extending there through;
    a fan operatively located in the passage;
    a motor operatively connected with the fan, the motor including a drive shaft that slides along its length between an on position and an off position; and
    a damper located in the passage, the damper being moveable between a closed position in which the passage is blocked and an open position in which the passage is not blocked, the damper being operatively connected with the drive shaft such that the damper moves to the open position when the drive shaft slides to the on position and the damper moves to the closed position when the drive shaft slides to the off position;
    wherein the housing further defines a wall, wherein the fan has a base plate that is spaced from the wall when the drive shaft is in its off position, and wherein the fan base plate is adjacent the wall when the drive shaft is in its on position such that operation of the fan develops a low pressure area between the fan and the wall and biases the fan toward the wall.

* * * * *